Figure 1:
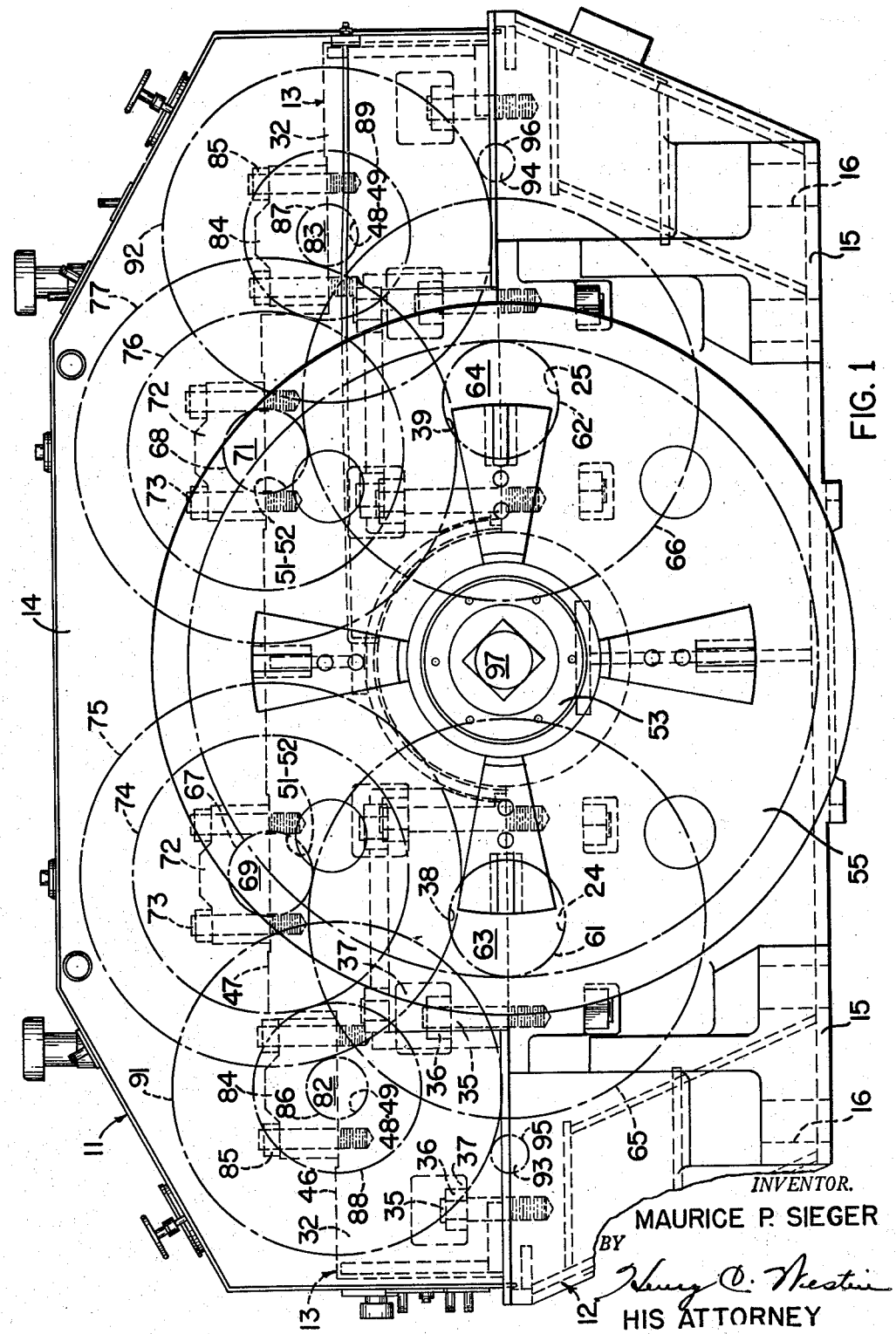

INVENTOR.
MAURICE P. SIEGER
BY
HIS ATTORNEY

July 9, 1963

M. P. SIEGER 3,096,674

HEADSTOCK FOR LATHE

Filed July 29, 1960

2 Sheets-Sheet 2

INVENTOR.
MAURICE P. SIEGER
BY
Henry C. Westin
HIS ATTORNEY

United States Patent Office 3,096,674
Patented July 9, 1963

1

3,096,674
HEADSTOCK FOR LATHE
Maurice Paul Sieger, Upper St. Clair Township, Allegheny County, Pa., assignor to United Engineering and Foundry Company, Pittsburgh, Pa., a corporation of Pennsylvania
Filed July 29, 1960, Ser. No. 46,139
1 Claim. (Cl. 82—28)

This invention relates to an improved headstock assembly adapted for use in conjunction with heavy duty type lathes and like metal processing machinery and particularly is addressed to an improved headstock assembly wherein the supporting means for the face plate gear is rendered substantially free from the tooth pressures thereof, the physical dimensions and weight of the component elements are appreciably reduced and a compact rigidly supported driving system is provided.

In the design of lathes to machine large rolling mill rolls and like metallic articles which may be of a weight of the order of 300,000 pounds when present day lathe technology is employed, the result is that there will be an enormous increase in the physical dimensions of the component elements. For example, with respect to the design of the headstock assembly, the necessity of substantially increasing the diameter and width of the face plate gear, the inavoidably extended arrangement and increased diameters of the gearing and the necessity for larger motors, makes the use of such assembly grossly uneconomical, if not prohibitive. Moreover, the adverse forces imposed upon the lathe incident to machining of articles possessing such weight, particularly in view of the requirement for extreme accuracy, presents a serious engineering problem.

The present invention provides a headstock assembly that will accommodate articles of considerable weight, as mentioned above, wherein the driving system is so arranged and constructed that the driving torque is delivered to the face plate gear by two or more pinions, whereby the torque is divided in a manner that the thrust transmitted to the face plate supporting means is either eliminated altogether or is appreciably reduced.

As a direct result of this arrangement, the diameter and width of the face plate can be considerably reduced in size. This means that the reduction in width and weight will allow a smaller supporting shaft to be used thereby reducing the cantilever effect and deflection of the shaft.

Even more important, the transmission of the torque to the face plate gear in the manner disclosed herein makes possible the rendering of the face plate supporting shaft and bearing free from thrust normally caused by pressure at the gear teeth whereby shaft deflection and bearing wear are appreciably obviated. This not only permits a more simplified and economical bearing design, but concentric rotation of the face plate about the shaft is assured thereby contributing to most accurate machining.

The novel headstock driving system disclosed herein provides for driving the face plate from two separate gear trains and motors whereby the gear trains can be compactly arranged and rigidly supported thereby resulting in considerable less vibrations and, consequently, a much quieter operating headstock.

Not only does the improved headstock overcome the

2 aforesaid limitations of present-day lathe designs but it accomplishes this object in a manner that is economical both with respect to the initial investment and as to its upkeep.

Figure 2:
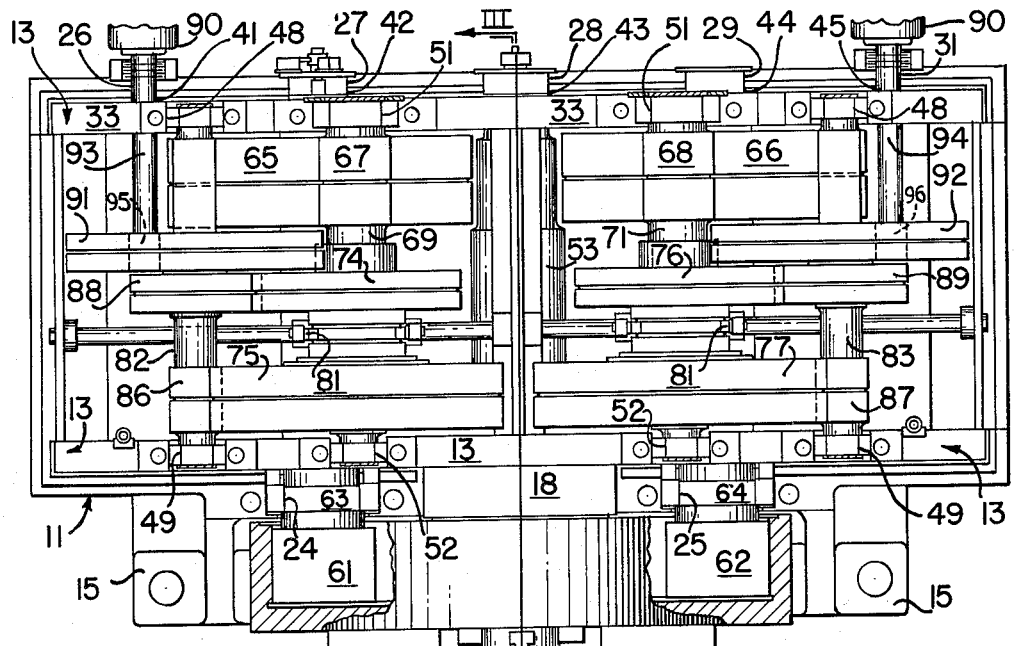
Figure 3:
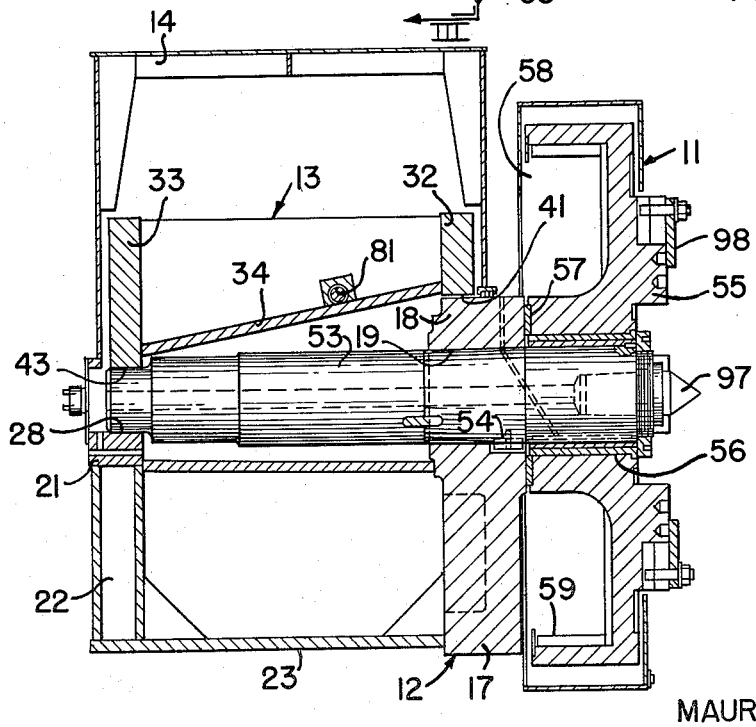

The above objects as well as the other novel features and advantages of this invention will be apparent from the following description and accompanying drawings of which:

FIG. 1 is a front elevational view of a headstock incorporating the features of the herein disclosed invention, FIG. 2 is a plan view of the headstock shown in FIG. 1 having the cover removed and the face plate broken away to show more clearly certain internal elements, and FIG. 3 is an elevational sectional view taken on lines III—III of FIG. 2.

With reference to the drawings, there is illustrated therein a headstock 11 incorporating the improvements of the invention disclosed herein. The headstock 11 consists of three major component parts: a headstock case 12, a bearing frame 13 and a cover 14. The case 12 is constructed in the form of a rigid base having a pair of feet at the front and rear thereof, the front ones 15 only being shown in FIGS. 1 and 2. The bolt holes 16 provided in the feet enable the headstock to be secured to the shoe plates of the lathe, not shown, with which it may be associated.

As shown in FIGURE 3, the front of the case 12 is constructed in the form of a thick solid bearing block 17 having a centrically located annular cartridge 18 on its upper side. The cartridge has a tapered opening 19, the purpose of which will be explained hereinafter. The back of the case comprises a solid bar 21 and welded supported members 22 extending the length of the headstock which are rigidly secured to the bearing block 17 by sundry supporting and separating plates of the nature of plates 23, for example. The top of the case 12 has a flat supporting surface around its perimeter, the forward portion of which is interrupted by bearing recesses 24 and 25 located on each side of the cartridge 18 and the rear portion of which is interrupted by bearing recesses 26, 27, 28, 29 and 31. The axes of the recesses 24 and 27 and 25 and 29, and the cartridge 18 and the recess 28 being in common vertical planes.

The bearing frame 13, made up of front and rear castings 32 and 33, respectively and rigidly joined together by a number of supporting and separating members, such as member 34, shown in FIG. 3, is adapted to fit on top of the case 12 and rest on the flat surfaces. This case is provided with tapped holes in the front and rear to receive screws 35 having nuts 36 adapted to engage the horizontal surface at the bottom of the holes 37 provided in the vertical walls of the bearing frame 13 whereby the case and frame are rigidly connected together. The lower surface of the front of the bearing frame 13 is provided with bearing recesses 38 and 39 which correspond to bearing recesses 24 and 25 in the case 12. In addition, a large recess 41 is provided as is shown in FIG. 3, which passes around the top cartridge 18. At the lower rear surface of the bearing frame 13 there are provided bearing recesses 41, 42, 43, 44 and 45 of which recesses 42, 43, and 44 correspond with recesses 27, 28 and 29, respectively, formed in the case 12. As shown in FIG. 1 the bearing frame is stepped having horizontal surfaces 46 at the lower elevation and horizontal surfaces 47 at the upper elevation. The lower surfaces 46 have recesses 48 and 49 in the front and back thereof and the upper surfaces likewise are provided with recesses 51 and 52.

Now turning to the operative elements of the headstock assembly, a stiff non-rotational shaft 52 is received in the tapered openings 19 of the cartridge 18 at the front and at the rear in the recess 28 of the case 12 and in the recess 43 of bearing frame, a key 54, shown in FIG. 3, being employed to prevent rotation thereof. The shaft 53 overhangs the front end of the headstock and on this portion there is rotatably mounted an annular face plate 55. A sleeve type bearing 56 is provided on both the shaft and inner periphery of the face plate and, in addition, a disk bearing 57, as best shown in FIG. 3, is located between the adjacent vertical faces of the case 12 and the face plate 55. The back of the face plate has a recess 58 of sufficient depth, on the outer periphery on which there is formed internal teeth which constitute the face plate gear 59.

As shown in FIGS. 1 and 2, there are provided a pair of diametrically arranged pinions 61 and 62 in meshing relation with the face plate gear 59. The axes of pinions 61 and 62 are arranged in a plane containing the axis of the face plate 55 so that the resulting forces due to the tooth pressure on the face plate gear incident to operation are equal and diametrically opposite to each other. The net result is that the forces balance one another and, therefore, are not transmitted as a side thrust to the bearing 56 or the shaft 53. Additional advantages of this construction, as heretofore mentioned, are that the tooth pressure is reduced to one-half of what it would be in a single pinion arrangement, and the face plate reduced considerably both in diameter and width with the resultant decrease in the cantilever force on the shaft 53. In addition to obviating consequential excess bearing load, the minimizing of the shaft deflection also assures concentric rotation of the face plate. The concentric rotation is also improved by virtue of the fact that the tooth pressures are cancelled out and bearing wear thereby reduced appreciably. The reduction in face plate diameter also permits the center thereof to be located nearer to the base of the sturdy case 12, thereby obtaining a better gear supporting condition.

It is another feature of this invention to drive each pinion 61 and 62 by separate symmetrical gear trains and separate motors and, accordingly, each pinion is mounted on a shaft 63 and 64 journaled in bearings received in the recesses 24—38 and 25—39 at the front and recesses 27—42 and 29—44 at the rear of the headstock. At the rear of the headstock, there is secured to and rotatable with the shafts 63 and 64 gears 65 and 66. Substantially directly above the gears 65 and 66 arranged in meshing relation therewith are gears 67 and 68 secured to and rotatable with shafts 69 and 71. These shafts are journaled in bearings received in the recesses 51 and 52 at the front and rear of the bearing frame 13. Bearing caps 72 are secured to the bearing frame by bolts 73, as best shown in FIG. 1.

Toward the front of the headstock, there are gears 74 and 75, 76 and 77, respectively, mounted upon and rotatable relative to the shafts 69 and 71, gears 74—76 being smaller in diameter than gears 75 and 77. Between the gears 74 and 75, in the case of shaft 69 and gears 76 and 77, in the case of shaft 71, there are secured to the respective shafts and rotatable therewith clutch gears, not specifically shown. By means of a rotating rod and yoke assembly 81, the clutch gears are adapted to be moved axially along shafts 69 and 71 to the right or left so as to engage either gears 74 or 75, or 76 or 77, thereby to impart a selected rotational speed to the shafts 69 and 71. It is deemed not to be necessary to show the details of the clutch gear assembly aside from designating the rod and yoke assembly as shown in FIG. 2.

To the one side of the shafts 69 and 71 and on the lower elevational surfaces 46 of the bearing frame 13, there are arranged shafts 82 and 83 which are supported in bearings which, in turn, are received in the recesses 48 and 49. The bearing caps 84 and bolts 85 secure the shafts to the bearing frame. At the front end of the shafts 82 and 83, there are secured thereto gears 86 and 87 arranged to mesh with gears 75 and 77. Likewise, toward the center of the shafts, gears 88 and 89 are secured thereto and adapted to mesh with gears 74 and 76. Immediately behind the gears 88 and 89, there are secured to the shafts 82 and 83 gears 91 and 92. Mounted in the recesses 26—41 and 31—45 at the rear of the case 12 and bearing frame 13, there are motor shafts 93 and 94 having gears 95 and 96 secured thereto. As shown in FIG. 2, the shafts 93 and 94 extend from the rear of the headstock to the center thereof, the inner ends of the shafts being received in bearing block assemblies secured to the case. The shafts 93 and 94 protrude through the vertical rear wall of the headstock to provide connections for separate driving motors 90.

As shown in FIGS. 1 and 3, the unitary cover 14 fits over the vertical walls of the bearing frame 13 and rests on top of the case 12 to which it is secured by suitable fastening means. As is customary, a tapered center pin 97 is received in a tapered recess at the end of the shaft 53 for supporting one end of a workpiece to be turned in the lathe. The usual lugs 98 are also provided on the outer portion of the face plate 55 which cooperate with an adaptor secured to the end of the roll and by which means the torque is transmitted to the workpiece such as a roll or the like.

As expressed heretofore, the provision of symmetrical separate trains of gears in combination with the dual pinion arrangement affords a very compact driving system so that the overall size of the headstock is thereby greatly reduced. Since the respective gears can be made much smaller in the improved headstock assembly, they can be mounted closer to the shoe plates, hence are supported more rigidly which results in quieter operation. Another advantage that flows from the compact gear arrangement disclosed herein is that on merely removal of the cover 14, all the gear shafts, bearings and integral parts are exposed for their ready inspection.

While in the preferred arrangement of the improved headstock two diametrically arranged pinions have been disclosed and illustrated, it will be apparent to those skilled in the art that various combinations of pinions may be employed whereby the resultant forces due to the tooth pressures of the pinions in rotating the device may be made to balance each other without departing from the teachings of the present invention.

In accordance with the provisions of the patent statutes, I have explained the principle and operation of my invention and have illustrated and described what I consider to represent the best embodiment thereof. However, I desire to have it understood that within the scope of the appended claim, the invention may be practiced otherwise than as specifically illustrated and described.

I claim:

A heavy duty head stock assembly composing a rigid base, said base made up of a lower member and an upper member and having formed therein pairs of cooperative journal recesses and a plurality of other journal recesses, said upper member carried by said lower member, a horizontally arranged non-rotating shaft received in one pair of the cooperative recesses of said members overhanging one side thereof, a workpiece engaging element secured in the end of the overhanging portion of said shaft, a face plate rotatably mounted on and carried by the overhanging portion of said shaft, said face plate having an annular recess on its inboard side, an internal gear formed on said face plate at the outer periphery of said recess, a pair of pinions rotatably received into others of said pairs of cooperative recesses of said members, said pinions being arranged at diametrically opposite points on the outer periphery of said face plate and in meshing relation with said internal gear, two symmetrical trains of gears carried on shafts received in the other journal recesses of said members for driving said pinions in the same rotational direction, the gears of said trains being compactly situated in and arranged relatively close to the bottom of said base, separate motors connected to said trains, a cover adapted to fit over and be secured to said base, said base and cover being so constructed whereby on removal of said cover the trains of gears are exposed.

References Cited in the file of this patent

FOREIGN PATENTS

| 16,449 | Great Britain | July 25, 1903 |
| 252,321 | Great Britain | Apr. 7, 1927 |